United States Patent
Schubring et al.

(10) Patent No.: US 7,022,991 B2
(45) Date of Patent: Apr. 4, 2006

(54) ACTIVE REGULATOR FOR MAXIMIZING PYROELECTRIC SENSITIVITY

(75) Inventors: Norman William Schubring, Troy, MI (US); Joseph Vito Mantese, Shelby Township, MI (US); Adolph Louis Micheli, Harrison Township, MI (US); Gregory William Auner, Livonia, MI (US); Ratna Naik, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 303 days.

(21) Appl. No.: 10/170,292

(22) Filed: Jun. 12, 2002

(65) Prior Publication Data

US 2002/0190209 A1    Dec. 19, 2002

Related U.S. Application Data

(60) Provisional application No. 60/297,986, filed on Jun. 13, 2001.

(51) Int. Cl.
*G01J 5/00* (2006.01)
(52) U.S. Cl. .................. 250/338.3; 250/338.2
(58) Field of Classification Search ............. 250/338.2, 250/338.3
See application file for complete search history.

(56) References Cited

U.S. PATENT DOCUMENTS

| | | | |
|---|---|---|---|
| 6,190,925 B1 * | 2/2001 | Li et al. | 438/3 |
| 6,294,784 B1 | 9/2001 | Schubring et al. | |
| 6,339,221 B1 | 1/2002 | Schubring et al. | |

FOREIGN PATENT DOCUMENTS

| | | | |
|---|---|---|---|
| JP | 6-109536 A | * | 4/1994 |
| JP | 8-186182 A | * | 7/1996 |
| JP | 11-281490 A | * | 10/1999 |

* cited by examiner

*Primary Examiner*—Constantine Hannaher
(74) *Attorney, Agent, or Firm*—Stefan V. Chmielewski

(57) ABSTRACT

A pyroelectric sensor having an active regulation for maximizing pyroelectric sensor sensitivity is disclosed. The pyroelectric sensor comprises a ferroelectric transducer, and a regulator. The ferroelectric transducer may either be a homogenous ferroelectric transducer, a compositionally graded ferroelectric transducer, or an externally graded ferroelectric transducer. The regulator may either be an excitation regulator or a temperature regulator. A method for regulating the excitation or the temperature of a pyroelectric sensor for maximizing sensitivity of the pyroelectric sensor is also disclosed.

23 Claims, 14 Drawing Sheets

ACTIVE REGULATOR FOR MAXIMIZING PYROELECTRIC SENSITIVITY

This application claims priority to U.S. Provisional Application No. 60/297,986 filed Jun. 13, 2001.

TECHNICAL FIELD

The present invention relates to pyroelectric sensors. More specifically, the present invention relates to pyroelectric sensors having an active regulator for maximizing pyroelectric sensor sensitivity.

BACKGROUND OF THE INVENTION

As seen in FIG. 12, a conventional passive mode pyroelectric temperature sensing system (e.g. a night vision system) employs a pyroelectric sensor 120 that operates either cryogenically to overcome noise, or at nominal room temperature for economy and convenience. The pyroelectric sensor 120 comprises a chopper 122, an infrared (IR) absorber 124, a pyroelectric element 126 (i.e. a ferroelectric transducer that exhibits a symmetrical hysteresis loop), a current integrating capacitor 128, and a baseband amplifier 129. The pyroelectric element 126 is typically implemented in a Sawyer-Tower circuit design and is homogenous in nature.

The input of the pyroelectric sensor 120 is an IR radiation of temperature. The output of the pyroelectric element 126 is a quantity of charge as a function of time, Q(t), which is shown as an input for the baseband amplifier 129. The output of the baseband amplifier 129 is an electrical analogue of incident IR.

The pyroelectric sensor 120 operates as a static DC device, where a change in radiated infrared temperature causes a slight change in static bound-charge. As shown in FIG. 13, the differential area, A, of a saturated pyroelectric hysteresis loop, represents the polarization energy stored in the sensor 120. The differential area, A, of the symmetrical hysteresis loop is a direct function of radiated infrared temperature, T1, T2 (FIG. 14).

Referring to FIG. 14, if T2 is greater than TI, the hysteresis loop will exhibit a size reduction and decrease in polarization, which is the charge, Q. In such a conventional temperature sensing system, a change in radiated infrared temperature T1, T2 causes a slight change in static DC bound-charge $Q_1$, $Q_2$. However, a mobile free charge, which also exists in the system, flows at some definite time constant and tends to neutralize the change in bound-charge. Therefore, to deceive the human eye, the pyroelectric sensor 120 is reset in temperature at a frequency (approximately 15 Hz) in order to detect a change in radiated infrared temperature T1, T2. The change in radiated infrared temperature T1, T2 is detectable provided that the chopper 122 overcomes the time-constant of the sensor 120. Consequently, the very low frequency of the temperature-reset, dictates a sluggish, inefficient response.

As shown in FIG. 15, the area of the symmetrical hysteresis loop is represented for a case where the sensor 120 is driven from plus saturation, $P_s$, to minus saturation, $-P_s$. In such a case, it was discovered that with special circuitry (i.e. a rectifier, charge amplifier, and charge integrator), an active mode AC operation of homogeneous ferroelectric transducer resulted in a huge pseudo-pyroelectric effect. Instead of operating statically at some point on the hysteresis loop and noting the change in charge (i.e. $Q_1$, $Q_2$) with temperature (i.e. $T_1$, $T_2$), the entire loop was driven at a high frequency and the change in the loop area with temperature was noted. Because the sensor 120 is operated with alternating excitation, the accumulated area of the hysteresis loops per unit time can be immense. Temperature resetting is not required in such a case, thus increasing the signal to noise ratio.

For active mode AC operation of the homogeneous ferroelectric transducer, the electric field is cycled instead of temperature. Typically, the temperature of the scene is continuous but dithered; however, the value being sought is temperature. In such a case, while the temperature is dithered, the electric field is cycled. To achieve the latter behavior from a homogenous ferroelectric transducer, the special circuitry is typically employed in order to sum the areas of a hysteresis loop, wherein the areas of the loops are defined by a monotonic function of temperature.

It was also noted that by taking advantage of the AC traversing of the hysteresis loop many times per second, the signal to noise ratio for temperature sensing is immensely improved. More importantly though, as the speed of the response is greatly increased, in theory, specific applications can be achieved (e.g. rocket flight can be detectable in a night vision application).

Further, the area of the hysteresis loop of FIG. 15 changes most rapidly with temperature as the sensor 120 approaches the Curie temperature, or more specifically, the temperature that causes a maximum change in polarization per change in temperature. Graphically, the Curie temperature is approximately located at the point of maximum slope of the shrinking hysteresis loop near the temperature axis. The temperature range where the loops are most responsive to a change in temperature is approximately at or near the Curie temperature. Thus, the Curie temperature heavily factors into determining the sensitivity of the sensor.

In the example discussed above for FIGS. 12–15, the area of the hysteresis loop for a homogeneous ferroelectric transducer may result in a huge pseudo-pyroelectric effect and is most responsive to a temperature range that is at or near the Curie temperature. Although an active mode AC operation of homogeneous ferroelectric transducers may result from the use of special circuitry, it may not be easy to acquire the temperature for the most sensitive hysteresis loop at or near the Curie temperature. For a given ferroelectric transducer, the Curie temperature is fixed, while the quiescent temperature of the sensor (i.e. operating temperature) may vary considerably.

Even further as seen in FIG. 16, while the hysteresis loop is in saturation, a conventional pyroelectric sensor 160 that is driven with an AC excitation from a source 162 may not consistently convert received infrared energy to bound-charge. For efficiency, the sensor 120 must be converting radiated or conducted heat to bound-charge 100% of the time. Consequently, the hysteresis loop is driven just short of saturation, which effects the sensitivity of the pyroelectric sensor 160. For further reference, pyroelectric sensors are described in detail in U.S. Pat. Nos. 6,294,784 and 6,339,221 to Schubring et al.

Therefore, it is the objective of the applicants to overcome the fallbacks of conventional homogenous pyroelectric sensing systems by maximizing the sensitivity of the sensor during active operation. Even further, it is also contemplated by the applicants that the fallbacks of conventional homogenous ferroelectric transducer sensing systems may be overcome by implementing graded ferroelectric transducers in the Sawyer-Tower circuit configuration.

SUMMARY OF THE INVENTION

Accordingly, one embodiment of the invention is directed to a pyroelectric sensor having an active regulation for maximizing the sensitivity of the pyroelectric sensor. The pyroelectric sensor comprises a ferroelectric transducer and a regulator. The regulator operates the ferroelectric transducer at an optimum sensitivity.

Another embodiment of the invention is directed to a pyroelectric sensor having an active temperature regulation for maximizing the sensitivity of the pyroelectric sensor. The pyroelectric sensor comprises a ferroelectric transducer and a temperature regulator. The temperature regulator comprises a heating/cooling source that operates the ferroelectric transducer at an optimum sensitivity. The heating/cooling source either applies heat or cools the ferroelectric transducer in order to achieve maximized sensitivity.

Another embodiment of the invention is directed to a pyroelectric sensor having an active excitation regulation for maximizing the sensitivity of the pyroelectric sensor. The pyroelectric sensor comprises a ferroelectric transducer and an excitation regulator. The excitation regulator comprises a variably operated AC excitation source that operates the ferroeclectric transducer at an optimum sensitivity. The variably operated AC excitation source variably operates the ferroelectric transducer in order to achieve maximized sensitivity.

Another embodiment of the invention is directed to a pyroelectric sensor having an active regulation for maximizing the sensitivity of the pyroelectric sensor. The pyroelectric sensor comprises a ferroelectric transducer, a DC bias, and a regulator. The DC bias externally grades the ferroelectric transducer. The regulator operates the externally graded ferroelectric transducer at an optimum sensitivity.

Another embodiment of the invention is directed to a pyroelectric sensor having an active regulation for maximizing the sensitivity of the pyroelectric sensor. The pyroelectric sensor comprises a compositionally graded ferroelectric transducer and a regulator. The regulator operates the compositionally graded ferroelectric transducer at an optimum sensitivity.

Another embodiment of the invention is directed to a pyroelectric sensor having an active regulation for maximizing the sensitivity of the pyroeclectric sensor. The pyroelectric sensor comprises a homogenous ferroelectric transducer and a regulator. The regulator operates the homogenous ferroelectric transducer at an optimum sensitivity.

Accordingly, another embodiment of the invention is directed to a method for regulating a pyroelectric sensor in order to achieve maximum sensitivity of the pyroelectric sensor. The method comprises the steps of modifying a polarization state of a ferroelectric transducer with an external infrared temperature, determining an amount of energy of the ferroelectric transducer, and determining the maximum rate of change of energy of the ferroeclectric transducer.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
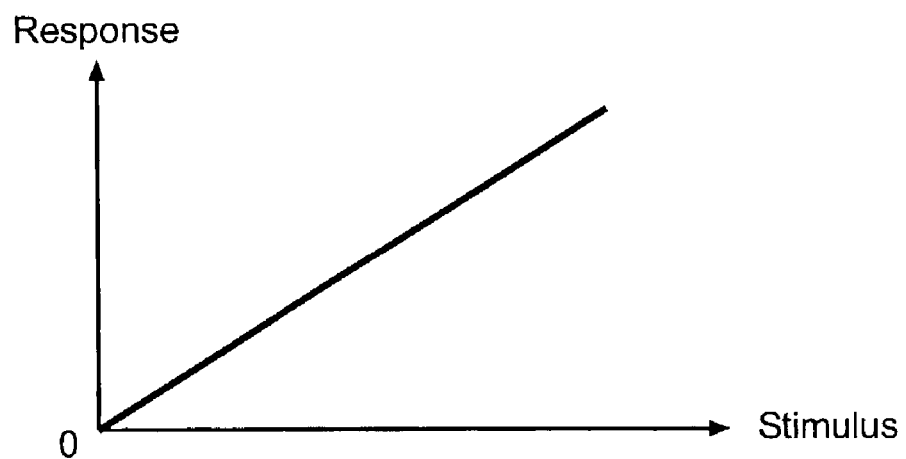
FIG. 1 is a graphical representation of a system having a single linear response to a single linear stimulus.

To understand where symmetrical and asymmetrical hysteretic systems fit in the progress of the following embodiments of the invention, a brief synopsis is in order. Referring to FIG. 1, any system shall always have at least one stimulus (represented on the x-axis) and one response (represented on the y-axis). For some degree of complexity, there may be multiple stimuli x(n), and/or multiple responses y(n), where n is an integer of one or more.

The integral of x*dy on an x-y plot is an area, which must necessarily represent a form of energy of some type (e.g. electrical energy). Because total energy is constant, all that can be done in a system is the movement of energy in one form or another. However, any energy movement always involves a cost. Some of the system's energy is exploited to reposition the remaining energy, or to change its form. In the case of a hysteretic system involving an external stimulus, such as an external power supply, the external power supply is usually considered to be an unaccountable "x source."

Figure 2:
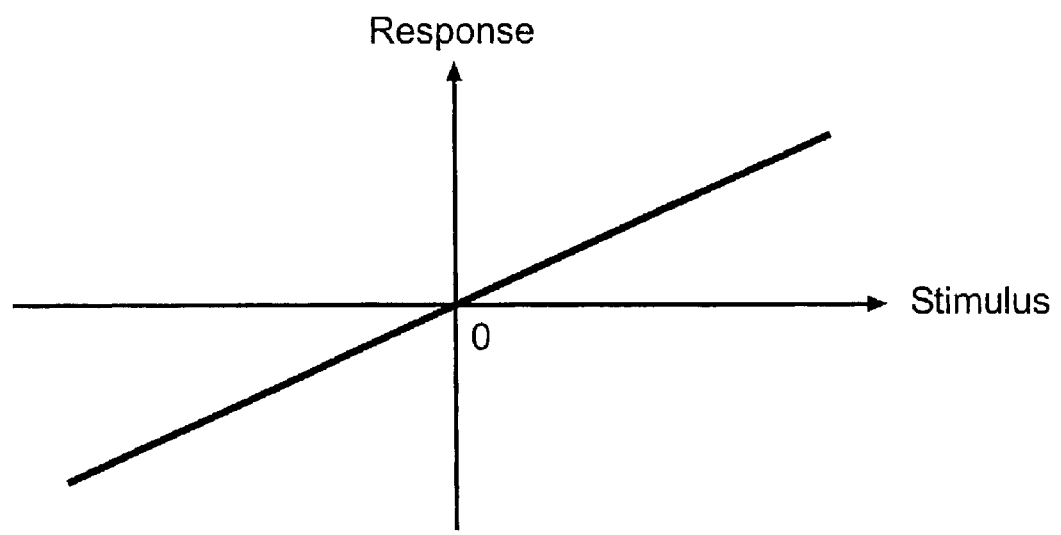
FIG. 2 is a graphical representation of a bilateral system having a single linear response to a single linear stimulus.

The energy stored in a linear system may be a direct function of the stimulus source; when the stimulus is zero no energy stored. As shown in FIG. 1, there is basically a single, linear, unilateral response to a single, linear stimulus. As shown in FIG. 2, if the system is bilateral, the behavior is balanced. Because stimulus is the independent variable, the energy of the system is always {Stimulus d(Response)}.

Figure 3:
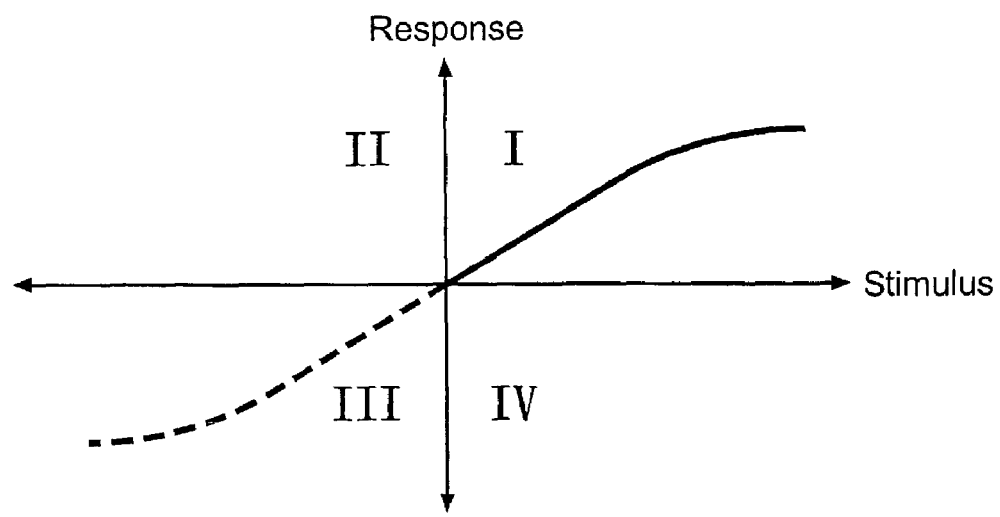
FIG. 3 is a graphical representation of a bilateral-nonlinear system having a single non-linear response to a single linear stimulus.

This fact becomes very important for the higher order, nonlinear, irreversible systems. As shown in FIG. 3, if the system is more complex, there may be nonlinearity or saturation in the first quadrant (I), or the first and third quadrants (I, III).

Figure 4:
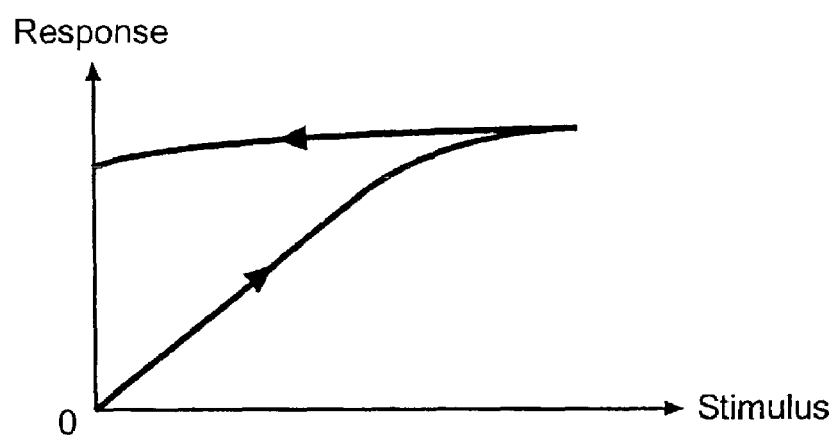
FIG. 4 is a graphical representation of a nonlinear, irreversible system having non-linear responses to a single linear stimulus.

As seen in FIG. 4, the system may also be nonlinear and irreversible. Irreversibility means that the system cannot retrace the path in reverse, but will seek a new path and never return to zero at the zero stimulus. In this case, all the energy is not returned in retreating to the origin, but rather, it is stored in the system. The stored energy is an inherent quality of the system to statically store energy by remembering the last stimulus.

Figure 5:
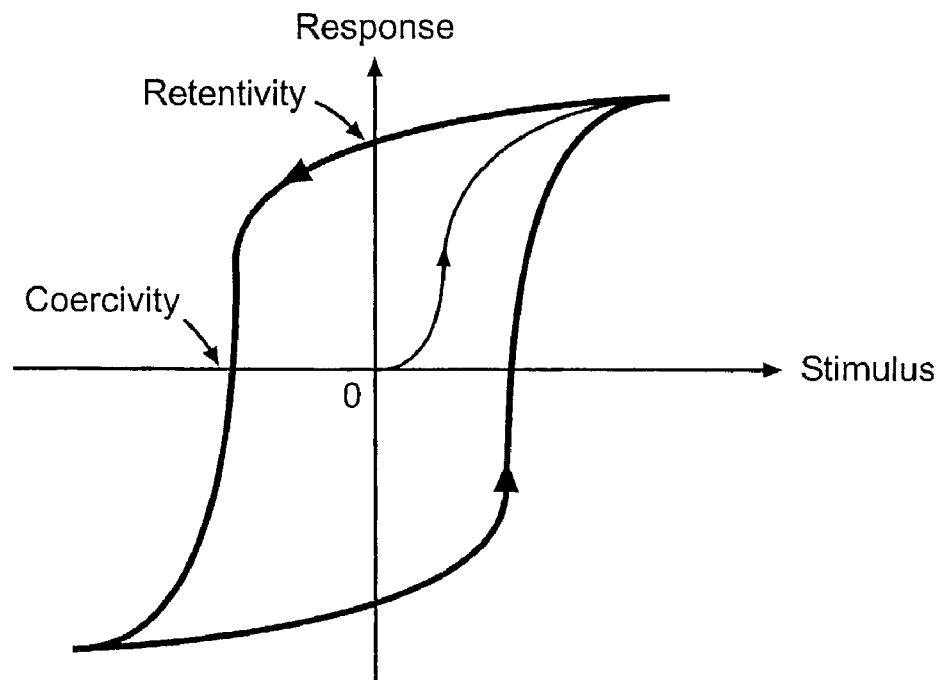
FIG. 5 is a graphical representation of a full cycle, nonlinear, irreversible system having non-linear responses to a single linear stimulus.

To complete the progression of symmetrical hysteretic systems, a full cycle, nonlinear, irreversible system is shown in FIG. 5. When the system is initially at rest and fully neutralized, a given stimulus creates an initial response that starts from the origin. However, once stimulated, the system memorizes the last stimulus, and retains some discrete values of the response.

For a single stimulus, the typical hysteresis is always counterclockwise. However, for multiple stimuli, the loop can be forced to reverse directions and go clockwise in the foregoing analysis. In a counterclockwise travel, the hysteresis indicates energy drawn into the system. For a clockwise travel, energy is released by the system. The only basic requirement is that the system can be able to permanently store energy. The latter portrayal constitutes all symmetrical hysteresis systems, where the response is not only nonlinear, but irreversible.

Figure 6A:
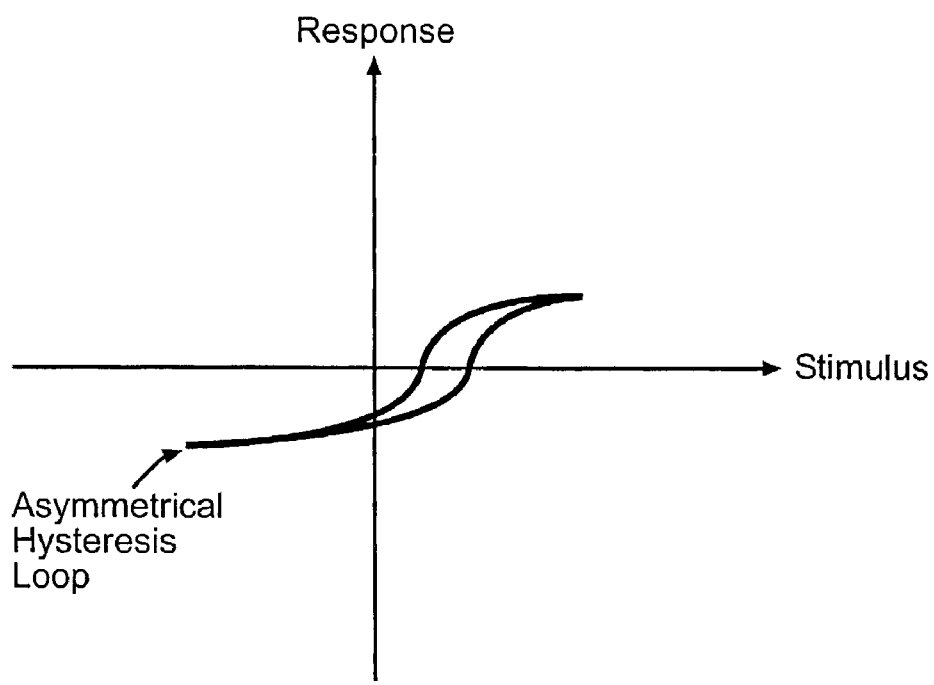
FIG. 6A is a graphical representation of a hysteretic system defined by an asymmetrical hysteresis loop.
Figure 6B:
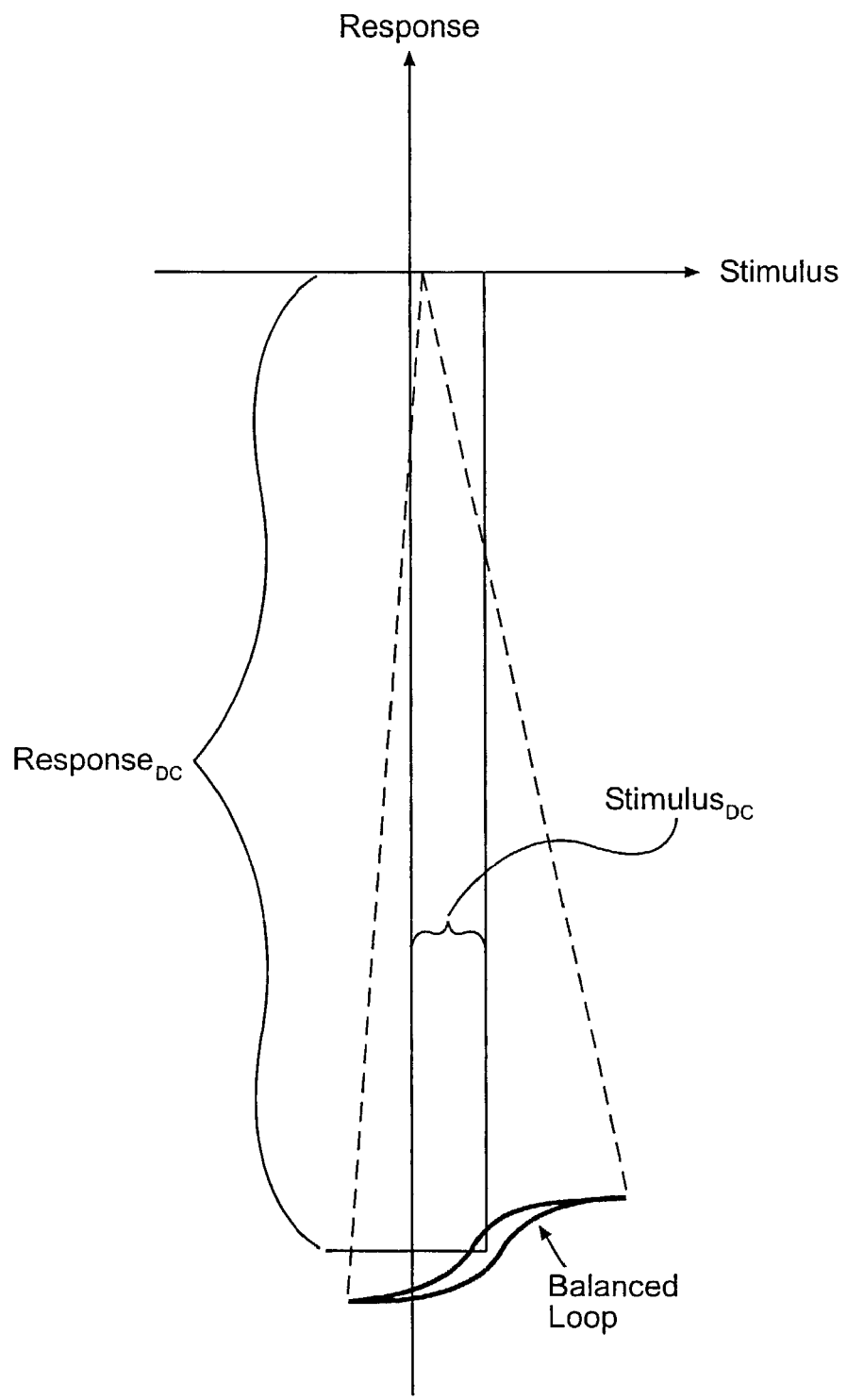
FIG. 6B is a graphical representation of an initial asymmetrical hysteretic system that ultimately transitions to a symmetrical hysteresis loop having an amplified effect.

Referring now to FIGS. 6A and 6B, asymmetrical hysteretic systems develop a significant amplified effect and results in hysteresis asymmetry. In FIG. 6A, an instantaneous hysteresis loop for an asymmetrical system is idealized with a slight shift in the positive x-direction. The shift defines an internal stimulus in the system or an external bias (i.e. an external stimulus) influencing the system. For example, before a ferroelectric transducer is excited by a periodic stimulus, the ferroelectric transducer is either graded compositionally with a strain gradient or temperature gradient (i.e. includes an internal stimulus) or influenced externally by an external stimulus, such as a DC electric field bias. Thus, in the absence of even exciting an asymmetrical system with the periodic stimulus, a graphical depiction of an instantaneous hysteresis loop is shown shifted (FIG. 6A) in the positive x-direction so as to define a stimulus that effects the system.

In FIG. 6B, once the periodic stimulus is applied to the system, an amplified effect in the negative y-direction (response) arises. The amplified effect may be static in nature and very useable in response to the periodic stimulus. The overall shift in the x- and y-direction that defines the amplified effect is identified by a DC stimulus and a DC response. Consequently, there is a net polarization in one direction.

According to one embodiment of the invention, a static offset in polarization, which relies upon hysteresis loop asymmetry, coupled with AC operation, may be accomplished by grading the ferroelectric transducer. A DC polarization offset is simply the result of an asymmetrical hysteresis loop that can be accomplished by either compositional grade with a strain gradient or a temperature gradient or by an electric field bias, as stated above. In the latter case, when a DC bias is applied to the ferroelectric transducer, the hysteresis loop can be forced to go asymmetrical.

Figure 7:
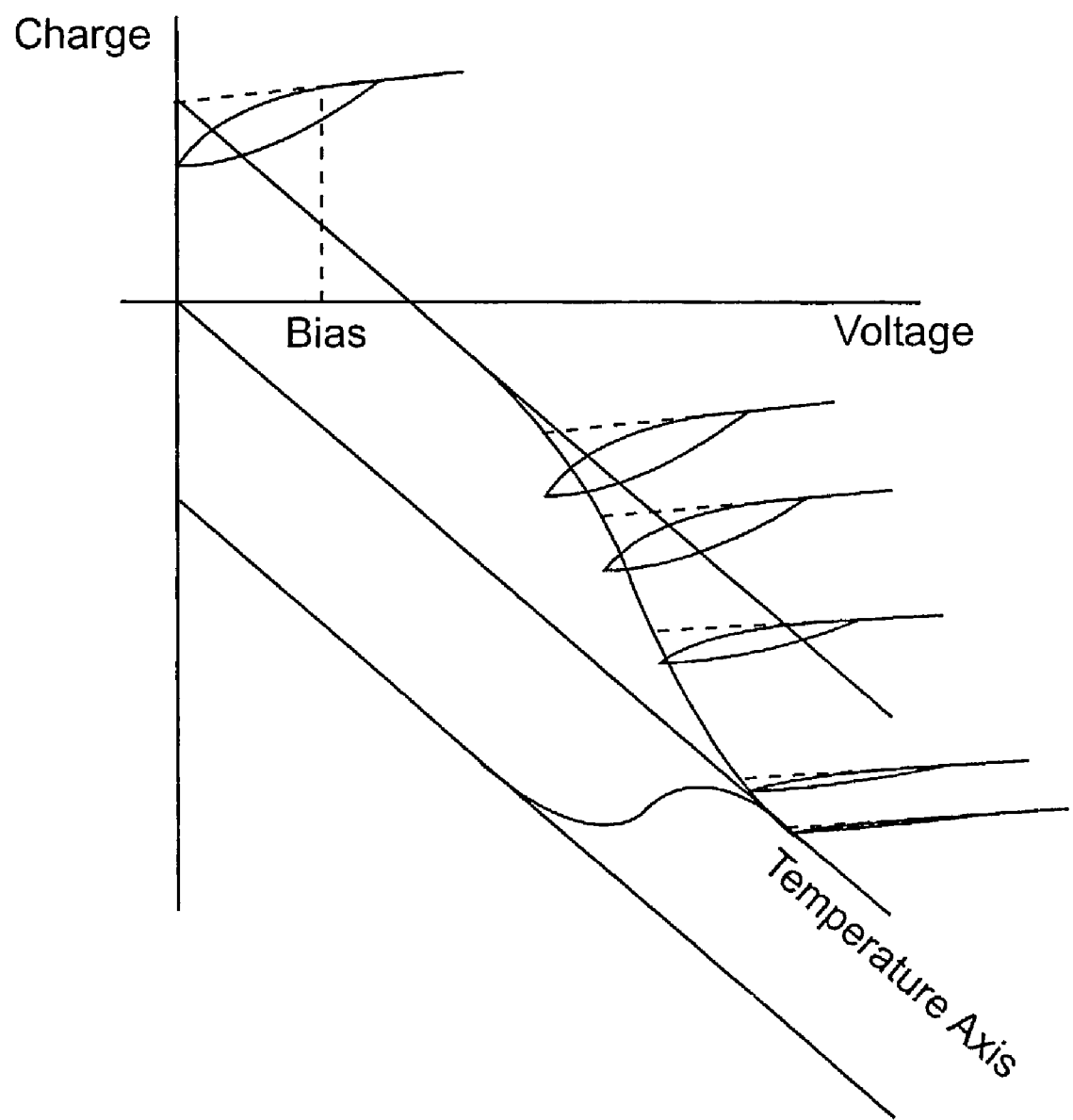
FIG. 7 is a representative diagram of initial hysteresis loop asymmetry for temperature change detection upon AC excitation.
Figure 8:
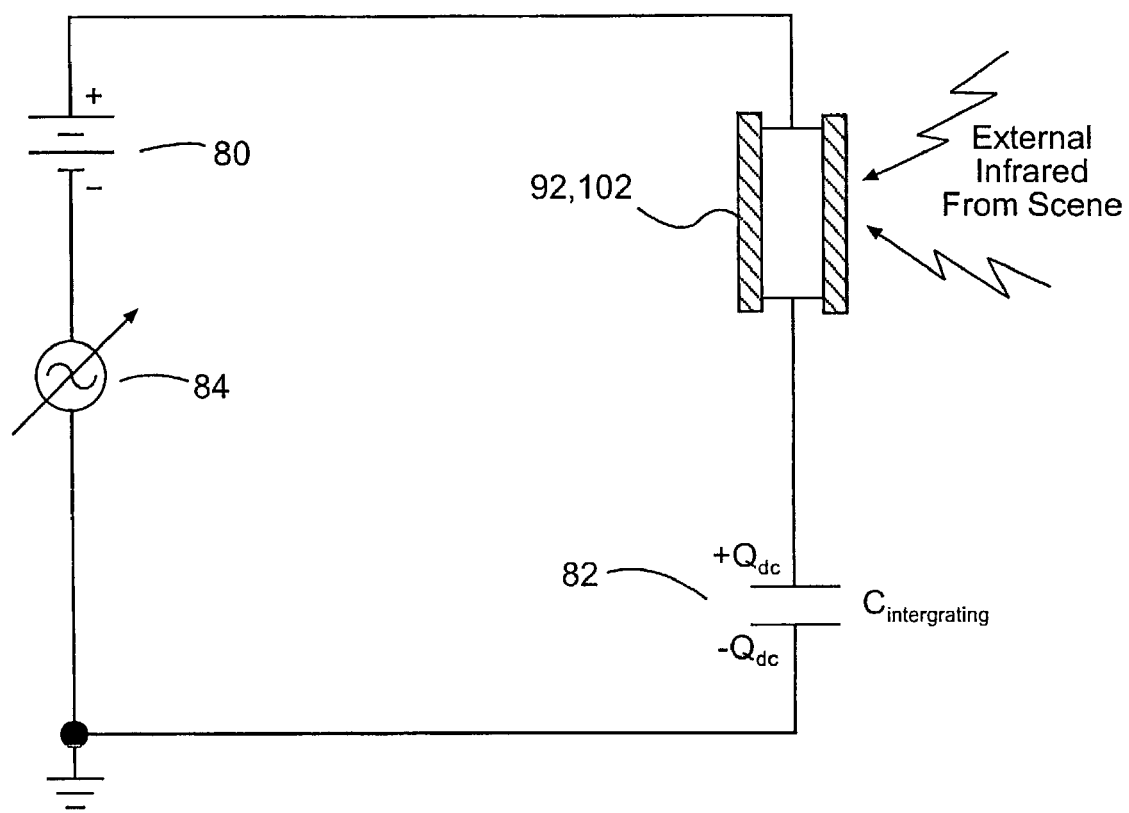
FIG. 8 is a series circuit including an externally biased dielectric hysteretic system comprising a ferroelectric transducer.

As shown in FIG. 7, a compositional grade or a DC bias can force such asymmetry. The net algebraic area of the loop is a strong function of temperature, particularly near the Curie temperature. Referring to FIG. 8, the circuitry for accomplishing such asymmetry for an external gradient is a simple series connection of a DC bias 80, a pyroelectric heat sensor 92, 102 (i.e. a homogeneous ferroelectric transducer or a graded ferroelectric transducer), and a current integrating capacitor 82 across a source of variable AC excitation 84. The variable AC excitation source 84 allows automatic field excitation of the pyroelectric heat sensor 92, 102 at the level per maximum output of the infrared scene. The variable AC excitation source 84 also provides automatic operation at a quiescent temperature (i.e. operating temperature) of the pyroelectric heat sensor 92, 102 that yields most output from the infrared scene. Thus, active regulation for maximizing the sensitivity of the pyroelectric heat sensor 92, 102 can be achieved.

Because the pyroelectric heat sensor 92, 102 is a nonlinear, irreversible device, it is apparently impossible to write a simple linear algebra expression for its maximum sensitivity. According to one embodiment of the invention best shown in FIG. 9, the pyroelectric heat sensor 92, which is shown to be driven by the variable AC excitation source 84 of FIG. 8, is regulated (i.e. driven) by a feedback technique that is hereinafter referred to as an excitation regulator 90. The excitation regulator 90 controls an AC excitation source 94 so that the pyroelectric heat sensor 92 operates at a maximum sensitivity level.

In the feedback technique for the excitation regulator 90, an external infrared temperature from the scene modifies the polarization state of the pyroelectric heat sensor 92 at step 91. At step 93, the area of the hysteresis loop (i.e. sensor energy) is continuously monitored and summed with any desirable, known circuitry (FIG. 11) such that the integral of the ferroelectric's voltage (V) multiplied by the difference in charge (dq) can be determined.

At step 95, the maximum rate of change of loop area per change in infrared temperature from the scene is compared to the driving AC signal strength excitation. The comparison at step 95 provides error signal feedback control of the AC excitation source 94 so that it may variably operate the pyroelectric heat sensor 92 at a maximized sensitivity. Any desirable, known circuitry (FIG. 11) may be implemented such that the maximum rate of change of loop area per change in infrared temperature from the scene is compared to the driving AC signal strength excitation.

For such an excitation regulator 90, the need for special circuitry (i.e. a rectifier, charge amplifier, and charge detector) is obviated. Even further, the need for a compositionally graded ferroelectric transducer (i.e. pyroelectric heat sensor 92) is obviated because the DC bias 80 forces the loop to go asymmetric. Although asymmetry is accomplished by employing the DC bias 80, a compositionally graded (i.e. internally graded) pyroelectric heat sensor 92 may be implemented to force the asymmetry. It will be appreciated that by employing either a compositionally graded or externally graded pyroelectric heat sensor 92, the need for special circuitry is obviated because the compositionally graded or externally graded ferroelectric hysteresis loop exhibits asymmetry and sums the area of the loop. Alternatively, the compositionally and externally graded ferroelectric transducers may be substituted for a plain, homogenous ferroelectric transducer.

Furthermore, for AC driven homogeneous ferroelectric transducers, there may be an amount of self-heating. If the ferroelectric transducer has substantial electric conductivity, the hysteresis loop area may primarily represent physical heating. If, however, the ferroelectric transducer has little or no electrical conductivity, the area is due solely to atomic rearrangement during polarization switching (i.e. dipole realignment with respect to each other). While energy is required and stored during polarization in one direction, the energy is recovered upon polarization reversal. But, additional energy is also required and stored to polarize in the opposite direction.

Figure 10:
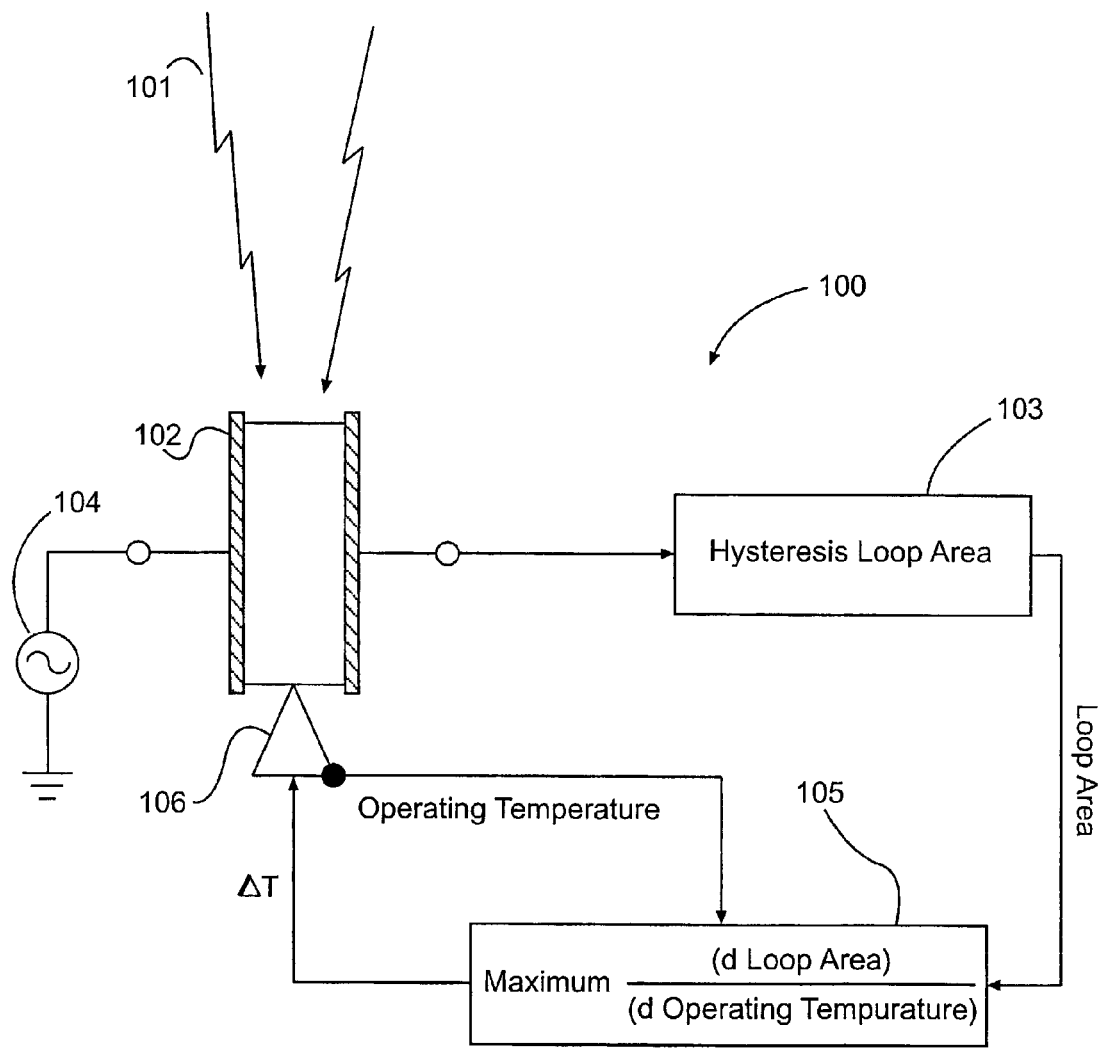
FIG. 10 is a representative diagram of a temperature regulator for operating the ferroelectric transducer according to another embodiment of the invention.

According to another embodiment of the invention as shown in FIG. 10, another regulation feedback technique is hereinafter referred to as a temperature regulator 100. The temperature regulator 100 operates the pyroelectric heat sensor 102 and is driven by an AC excitation source 104 and a heating/cooling source 106 at a maximum sensitivity level. The temperature regulator 100 variably operates the pyroelectric heat sensor 102 at or near the Curie temperature, or more specifically, the temperature that causes a maximum change in polarization per change in temperature. Because the sensitivity of the pyroelectric heat sensor 102 is a function of operating temperature, the goal is to operate the pyroelectric heat sensor 102 at a temperature that maximizes sensitivity. The operating temperature is controllable up to the highest temperature anticipated for a given application.

In feedback technique for the temperature regulator 100, an external infrared temperature from the scene modifies the polarization state of the pyroelectric heat sensor 102 at step 101. At step 103, the area of the hysteresis loop (i.e. sensor energy) is continuously monitored and summed with any desirable, known circuitry (FIG. 11) such that the integral of the ferroelectric's voltage (V) multiplied by the difference in charge (dq) can be determined.

At step 105, the maximum rate of change of loop area per change in infrared temperature from the scene is compared to the operating temperature of the heating/cooling source 106. The comparison at step 105 provides error signal feedback control (i.e. provides a change in temperature ΔT) for operating the heating/cooling source 106 such that it either applies heat or cools the pyroelectric heat sensor 102 in order to achieve maximized sensitivity. Any desirable, known circuitry (FIG. 11) may be implemented such that the heating or cooling of the heating/cooling source 106 can be controllable.

Figure 9:
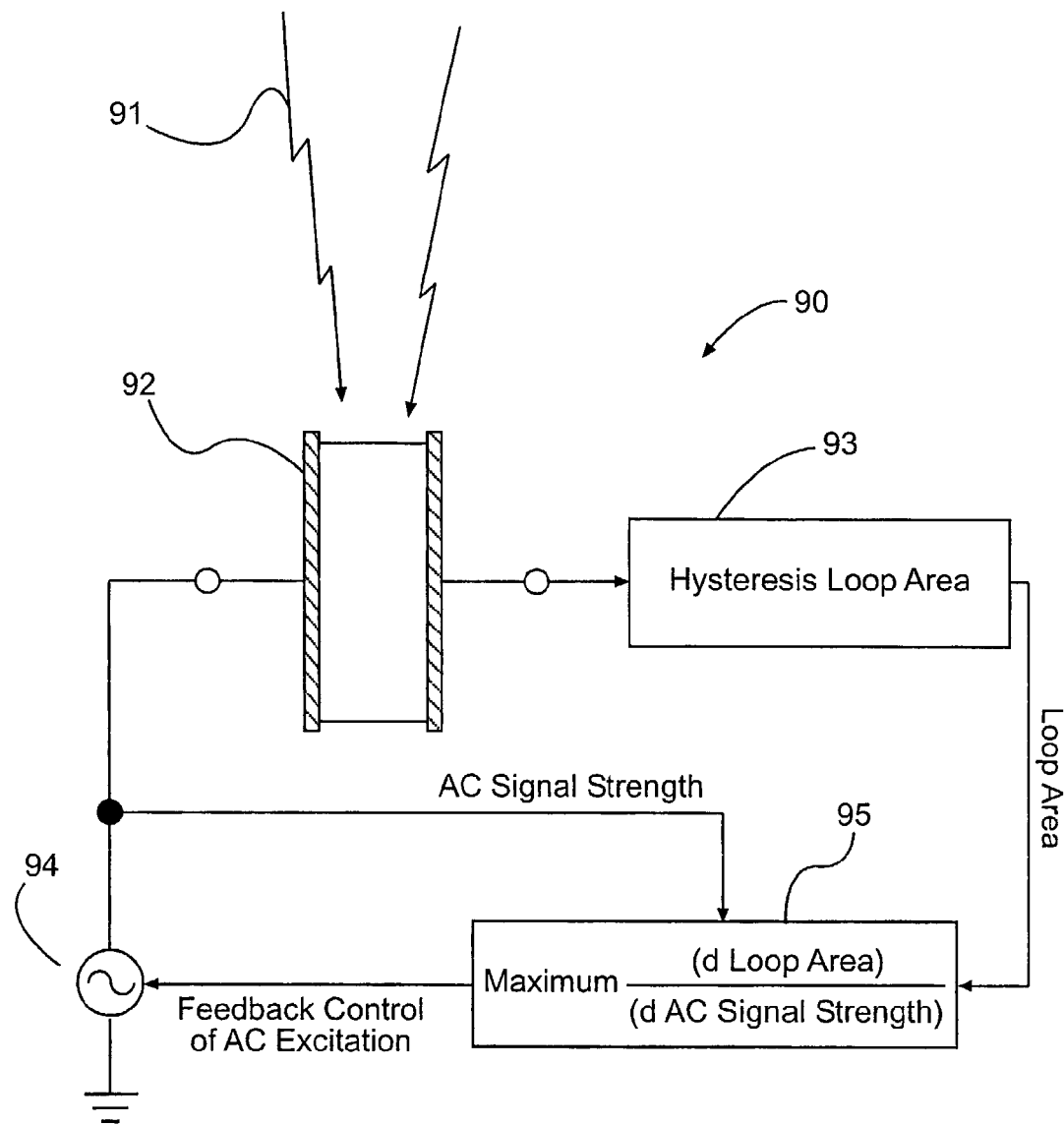
FIG. 9 is a representative diagram of an excitation regulator for operating the ferroelectric transducer according to one embodiment of the invention.

Essentially, the feedback techniques for the excitation regulator 90, and the temperature regulator 100 produces a feedback error signal that permits regulation of the pyroelectric heat sensor 92, 102. In FIG. 9, the error signal is fed back to the AC excitation source 94 in order to control the excitation. In FIG. 10, the error signal is fed back to the heating/cooling source 106 to control the temperature.

The feedback technique generally takes the difference in the area of the hysteresis loop (i.e. the system's energy) and divides it by the difference of the AC signal strength (FIG. 9) or the difference in the operating temperature (FIG. 10). Because the area of the hysteresis loop is the system's energy, it is represented by the following equation in terms of power, P, from the charge time derivative, dq/dt, which is equivalent to the current, I.

$$W=Vdq$$

$$dW/dt=V(dq/dt)=VI=P$$

Figure 11:
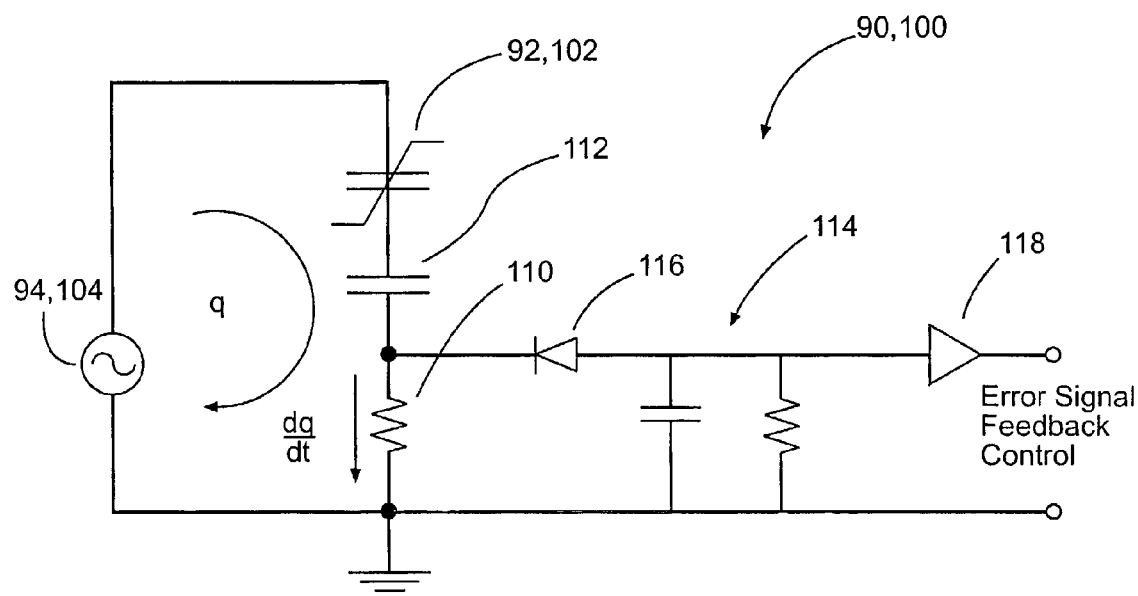
FIG. 11 is one embodiment of an implementation for generating an error signal for feedback control of either excitation or operating temperature.
Figure 12:
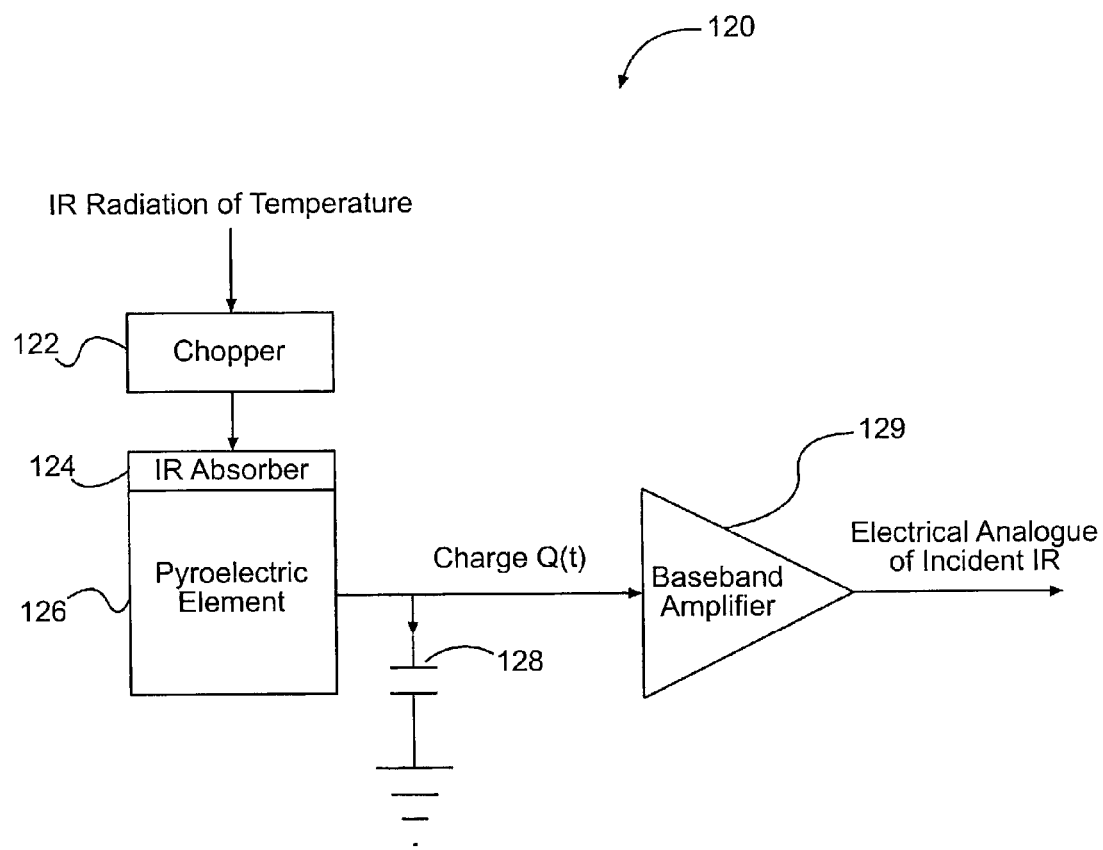
FIG. 12 is a representative diagram of a conventional pyroelectric temperature sensing system.
Figure 13:
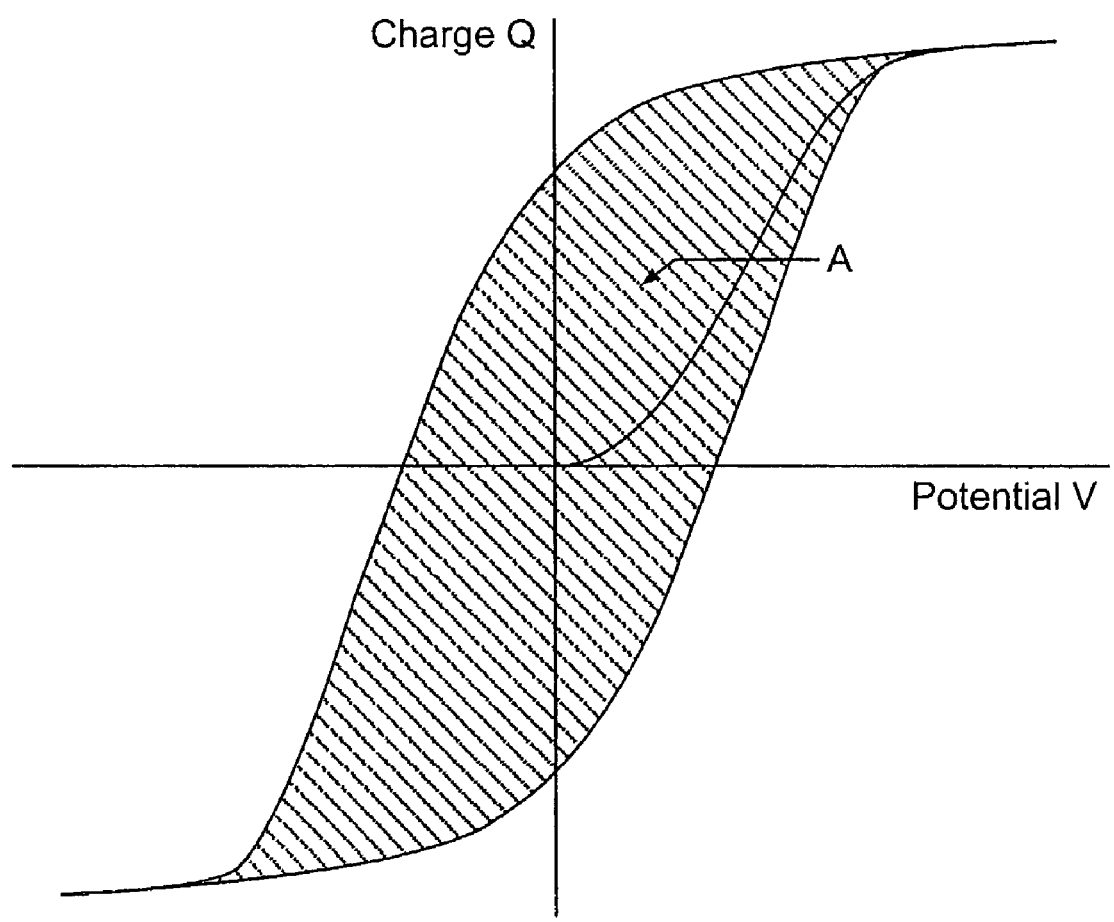
FIG. 13 is a graphical representation of a saturated hysteresis loop.
Figure 14:
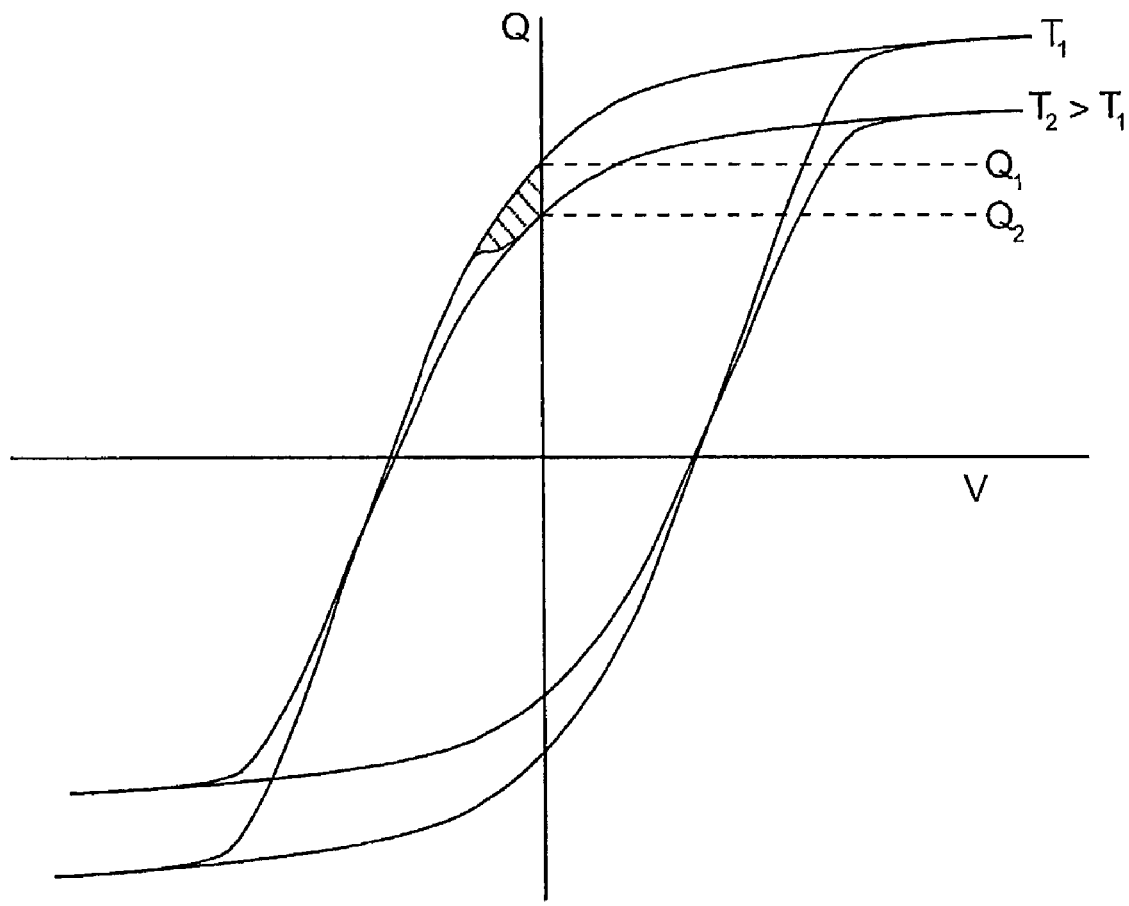
FIG. 14 is a graphical representation of a saturated hysteresis loop of FIG. 13 showing that area of the loop is a direct function of temperature and a change in static DC bound-charge.
Figure 15:
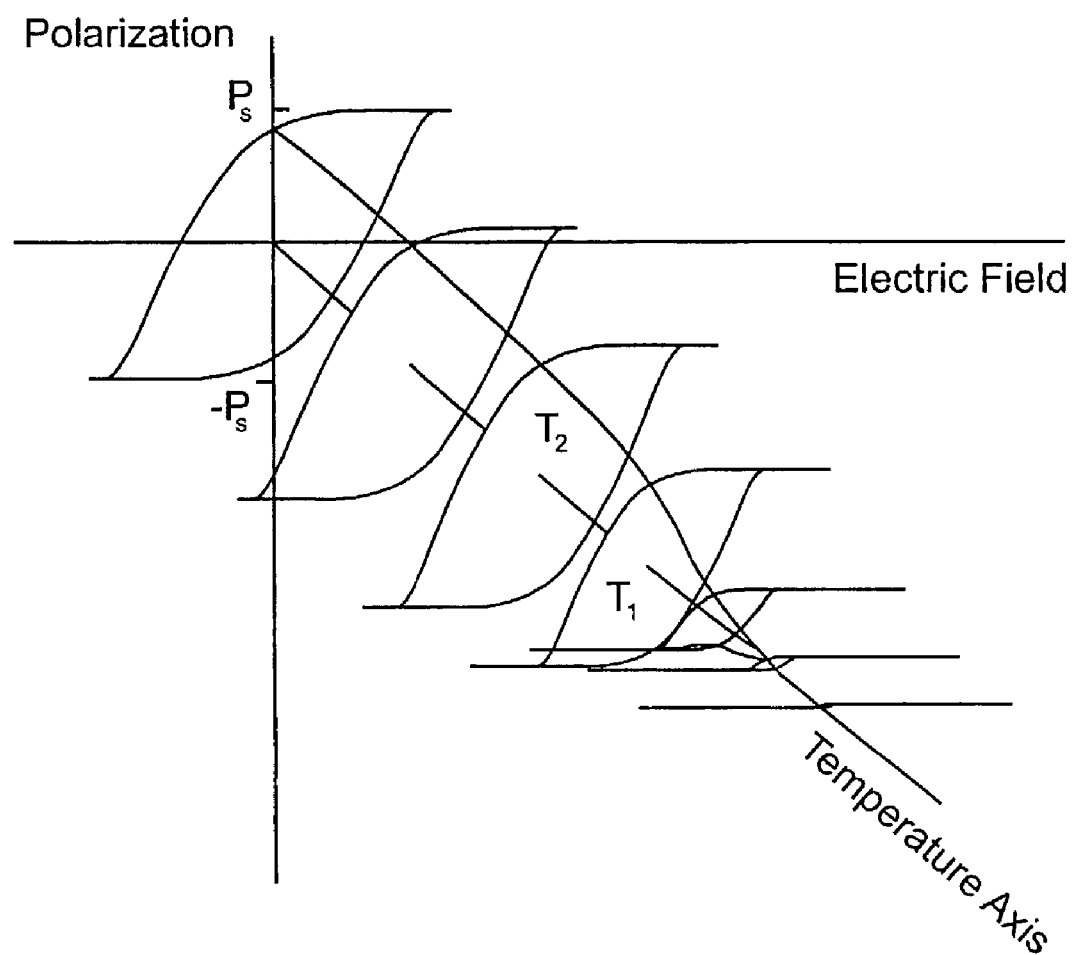
FIG. 15 is a graphical representation of initial hysteresis loop symmetry for temperature change detection upon AC excitation of the sensor according to FIG. 12.
Figure 16:
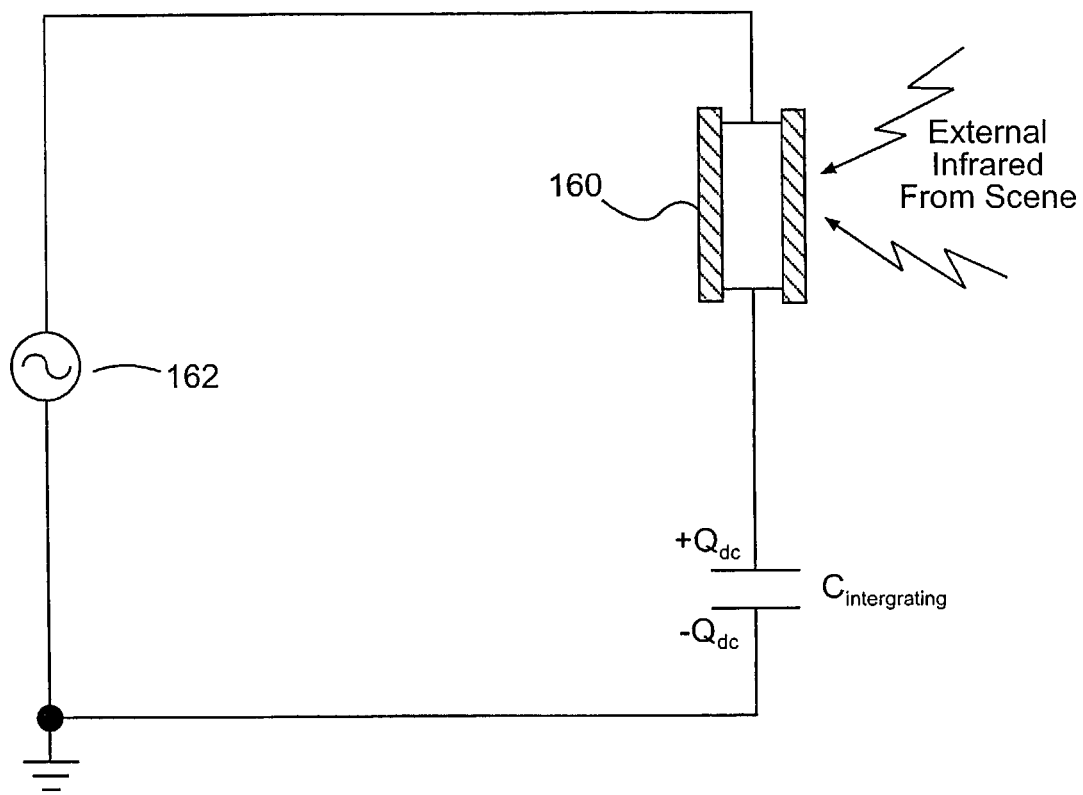
FIG. 16 is a representative diagram of a conventional pyroelectric temperature sensing system in the form of a series circuit that comprises a ferroelectric transducer.

In both situations, the feedback technique may be accomplished with the circuitry as shown in FIG. 11. The voltage, V, is an AC voltage that is essentially fixed in the system. The current, I, is detected by a current sensing resistor 110 connected in series with a capacitor 112. The current, I, versus the voltage, V, in a hysteresis loop system is usually referenced from a graphical "butterfly loop" (not shown) that exhibits peak points (i.e. peak current) in the system. An RC (resistor-capacitor) time constant, which is formed by a parallel RC combination 114, is located at the output of the current sensing resistor 110 so that there is response to the peak current in the system. The circuitry further comprises a detector 116 that detects the peak points, which is a signal that is proportional to the peak power, and an isolation amplifier 118 that produces the error signal feedback control at its load for controlling the excitation (FIG. 9) or the temperature (FIG. 10). The error signal may be fed beck to either the AC excitation source 94 or the heating/cooling source 106 with an oscillator (not shown).

The present invention may be applied in many situations that have varying operating temperature extremes. For example, in an automotive application, the ambient temperature in an automobile may either be very cold or very hot. The present invention realizes feedback control regulation for operating the pyroelectric heat sensor 92, 102 when the ambient temperature may vary considerably.

Accordingly, the present invention provides automatic field excitation of a pyroclectric element at the level per maximum output of the infrared scene. The present invention also provides automatic operation of the pyroelectric element at a quiescent temperature (i.e. operating temperature) that yields most output from the infrared scene.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A pyroelectric sensor having an active regulation for maximizing the sensitivity of the pyroelectric sensor, comprising:
   a ferroelectric transducer having a characteristic operating hysteresis loop;
   a DC bias that externally grades the ferroelectric transducer;
   a regulator that operates the ferroelectric transducer at an optimum sensitivity with an AC excitation large enough to substantially traverse the entire hysteresis loop; and
   a controller that provides a feedback error signal to the regulator to maximize the sensitivity of the ferroelectric transducer.

2. The apparatus according to claim 1, wherein the regulator is an excitation regulator that further comprises a variably operated AC excitation source, wherein the feedback error signal controls the variably operated AC excitation source and is determined by a maximum rate of change in ferroelectric transducer energy in view of a driving AC signal strength.

3. The apparatus according to claim 1, wherein the regulator is a temperature regulator that further comprises a heating/cooling source that either applies heat or cools the ferroelectric transducer in order to achieve maximized sensitivity, wherein the feedback error signal provides a change in temperature signal to the temperature regulator, wherein the feedback error signal is determined by a maximum rate of change in ferroelectric transducer energy in view of an operating temperature of the temperature regulator.

4. The apparatus according to claim 1, wherein the optimum sensitivity is an operable temperature that causes a maximum change in polarization per change in temperature.

5. The apparatus according to claim 4, wherein the operable temperature that causes a maximum change in polarization per change in temperature is the Curie temperature.

6. The apparatus according to claim 1, wherein the ferroelectric transducer is a homogenous ferroelectric transducer.

7. A pyroelectric sensor having an active temperature regulation for maximizing the sensitivity of the pyroelectric sensor, comprising:
   a ferroelectric transducer having a characteristic operating hysteresis loop;
   a DC bias that externally grades the ferroelectric transducer;
   a temperature regulator that operates the ferroelectric transducer at an optimum sensitivity, wherein the temperature regulator is a temperature regulator which further comprises a heating/cooling source that either applies heat or cools the ferroelectric transducer in order to achieve maximized sensitivity with an AC excitation large enough to substantially traverse the entire hysteresis loop; and
   a controller that provides a feedback error signal to the temperature regulator to maximize the sensitivity of the ferroelectric transducer.

8. The apparatus according to claim 7, wherein the optimum sensitivity is an operable temperature that causes a maximum change in polarization per change in temperature.

9. The apparatus according to claim 8, wherein the operable temperature that causes a maximum change in polarization per change in temperature is the Curie temperature.

10. The apparatus according to claim 7, wherein the ferroelectric transducer is a homogenous ferroelectric transducer.

11. A pyroelectric sensor having an active excitation regulation for maximizing the sensitivity of the pyroelectric sensor, comprising:
    a ferroelectric transducer having a characteristic operating hysteresis loop;
    an excitation regulator that operates the ferroelectric transducer at an optimum sensitivity, wherein the excitation regulator further comprises a large variably operated AC excitation source that variable operates the ferroelectric transducer by substantially traversing the entire saturation loop in order to achieve maximized sensitivity;
    a DC bias that externally grades the ferroelectric transducer; and
    a controller that provides a feedback error signal to the excitation regulator to maximize the sensitivity of the ferroelectric transducer.

12. The apparatus according to claim 11, wherein the optimum sensitivity is an operable temperature that causes a maximum change in polarization per change in temperature.

13. The apparatus according to claim 12, wherein the operable temperature that causes a maximum change in polarization per change in temperature is the Curie temperature.

14. The apparatus according to claim 11, wherein the ferroelectric transducer is a homogenous ferroelectric transducer.

15. A pyroelectric sensor having an active regulation for maximizing the sensitivity of the pyroelectric sensor, comprising:
    a homogenous ferroelectric transducer having a characteristic operating hysteresis loop;
    a DC bias that externally grades the ferroelectric transducer;
    a regulator that operates the homogeneous ferroelectric transducer at an optimum sensitivity with an AC excitation large enough to substantially traverse the entire hysteresis loop; and
    a controller that provides a feedback error signal to the regulator to maximize the sensitivity of the ferroelectric transducer1
    wherein the regulator is an excitation regulator that further comprises a variably operated AC excitation source, wherein the feedback error signal controls the variably operated AC excitation source and is determined by a maximum rate of change in ferroelectric transducer energy in view of a driving AC signal strength.

16. A method for regulating a pyroelectric sensor in order to achieve maximum sensitivity of the pyroelectric sensor, comprising the steps of:
    driving a ferroelectric transducer with a regulator, said transducer having a characteristic operating hysteresis loop;
    providing a DC bias that externally grades the ferroelectric transducer;
    modifying a polarization state of the ferroelectric transducer with an external infrared temperature;
    determining an amount of energy of the ferroelectric transducer;
    providing an AC excitation large enough to substantially traverse the entire hysteresis loop;
    determining the maximum rate of change of energy of the ferroelectric transducer; and
    providing a feedback error signal to the regulator to maximize the sensitivity of the ferroelectric transducer.

17. The method according to claim 16, wherein the regulator is a heating/cooling source, and wherein the driving step includes heating or cooling the ferroelectric transducer with the heating/cooling source.

18. The method according to claim 17, further comprising the step of operating the heating/cooling source at a different temperature in view of the feedback error signal, which provides a change in temperature signal to the heating/cooling source.

19. The method according to claim 16, wherein the regulator is an AC excitation source, and wherein the driving step includes providing variable AC control from a variable AC source, wherein the feedback error signal controls the variably operated AC excitation source.

20. The method according to claim 16, wherein the ferroelectric transducer is a homogenous ferroelectric transducer.

21. A pyroelectric sensor having an active regulation for maximizing the sensitivity of the pyroelectric sensor, comprising:

a homogenous ferroelectric transducer having a characteristic operating hysteresis loop;

a DC bias that externally grades the ferroelectric transducer;

a regulator that operates the homogeneous ferroelectric transducer at an optimum sensitivity with an AC excitation large enough to substantially traverse the entire hysteresis loop; and a controller that provides a feedback error signal to the regulator to maximize the sensitivity of the ferroelectric transducer, wherein the regulator is a temperature regulator that further comprises a heating/cooling source that either applies heat or cools the homogenous ferroelectric transducer in order to achieve maximized sensitivity, wherein the feedback error signal provides a change in temperature signal to the temperature regulator, wherein the feedback error signal is determined by a maximum rate of change in ferroelectric transducer energy in view of an operating temperature of the temperature regulator.

22. A pyroelectric sensor having an active regulation for maximizing the sensitivity of the pyroelectric sensor, comprising:

a homogenous ferroelectric transducer having a characteristic operating hysteresis loop;

a DC bias that externally grades the ferroelectric transducer;

a regulator that operates the homogeneous ferroelectric transducer at an optimum sensitivity with an AC excitation large enough to substantially traverse the entire hysteresis loop; and a controller that provides a feedback error signal to the regulator to maximize the sensitivity of the ferroelectric transducer, wherein the optimum sensitivity is an operable temperature that causes a maximum change in polarization per change in temperature.

23. The apparatus according to claim 22, wherein operable temperature that causes a maximum change in polarization per change in temperature is the Curie temperature.

\* \* \* \* \*